US011170984B2

(12) United States Patent
Schwede et al.

(10) Patent No.: US 11,170,984 B2
(45) Date of Patent: Nov. 9, 2021

(54) SMALL GAP DEVICE SYSTEM AND METHOD OF FABRICATION

(71) Applicants: Spark Thermionics, Inc., Berkeley, CA (US); The Trustees of the University of Pennsylvania, Philadelphia, PA (US)

(72) Inventors: Jared William Schwede, Berkeley, CA (US); Igor Bargatin, Wynnewood, PA (US); Samuel M. Nicaise, Philadelphia, PA (US); Chen Lin, Santa Clara, CA (US); John Provine, Berkeley, CA (US)

(73) Assignees: Spark Thermionics, Inc., Emeryville, CA (US); The Trustees of the University of Pennsylvania, Philadelphia, PA (US)

( * ) Notice: Subject to any disclaimer, the term of this patent is extended or adjusted under 35 U.S.C. 154(b) by 659 days.

(21) Appl. No.: 16/044,215

(22) Filed: Jul. 24, 2018

(65) Prior Publication Data

US 2019/0027347 A1 Jan. 24, 2019

Related U.S. Application Data

(60) Provisional application No. 62/536,202, filed on Jul. 24, 2017, provisional application No. 62/547,535, filed on Aug. 18, 2017, provisional application No. 62/692,512, filed on Jun. 29, 2018.

(51) Int. Cl.
*H02N 10/00* (2006.01)
*H01J 45/00* (2006.01)

(52) U.S. Cl.
CPC .................................... *H01J 45/00* (2013.01)

(58) Field of Classification Search
CPC ........... H01L 35/00; H01L 37/00; H01J 45/00
USPC .......................... 136/200, 205, 208; 310/306
See application file for complete search history.

(56) References Cited

U.S. PATENT DOCUMENTS

| | | | |
|---|---|---|---|
| 3,173,032 | A | 3/1965 | Maynard |
| 3,312,840 | A | 4/1967 | Dennis |
| 7,427,786 | B1 | 9/2008 | Cox |

(Continued)

FOREIGN PATENT DOCUMENTS

| | | | |
|---|---|---|---|
| JP | H07322659 | A | 12/1995 |
| KR | 20080040718 | A | 5/2008 |

OTHER PUBLICATIONS

Lee S-W. and Tai, Y-C. "A micro cell lysis device" Sensors and Actuators. A: Physical. 73(1-2), 74-79 (1999).

(Continued)

*Primary Examiner* — Brook Kebede
(74) *Attorney, Agent, or Firm* — Jeffrey Schox; Samuel Rosenthal

(57) ABSTRACT

A small-gap device system, preferably including two or more electrodes and one or more spacers maintaining a gap between two or more of the electrodes. A spacer for a small-gap device system, preferably including a plurality of legs defining a mesh structure. A method of spacer and/or small-gap device fabrication, preferably including: defining lateral features, depositing spacer material, selectively removing spacer material, separating the spacer from a fabrication substrate, and/or assembling the small-gap device.

20 Claims, 14 Drawing Sheets

(56) References Cited

U.S. PATENT DOCUMENTS

| | | | | |
|---|---|---|---|---|
| 2005/0016575 | A1* | 1/2005 | Kumar | H01L 35/00 136/205 |
| 2016/0017786 | A1* | 1/2016 | Kimura | H02N 3/00 60/320 |
| 2017/0183772 | A1 | 6/2017 | Bargatin et al. | |

OTHER PUBLICATIONS

Fitzpatrick, G. et al., "Demonstration of close-spaced thermionic converters" Proceeding 28th IECEC, 573-580 (1993).

Karalis, A. et al., "'Squeezing' near-field thermal emission for ultra-efficient high-power thermophotovoltaic conversion" Scientific Reports 6, 28472 (2016).

Lee, J-H et al., "Optimal emitter-collector gap for thermionic energy converters", Applied Physics Letters 100, 173904 (2012).

Radmilović-Radjenović, M. et al., "Breakdown voltage curves in direct current discharges in molecular gases at microgaps" Micro & Nano Letters 7(3), 232-234 (2012).

* cited by examiner

SMALL GAP DEVICE SYSTEM AND METHOD OF FABRICATION

CROSS-REFERENCE TO RELATED APPLICATIONS

This application claims the benefit of U.S. Provisional Application Ser. No. 62/536,202, filed on 24 Jul. 2017, U.S. Provisional Application Ser. No. 62/547,535, filed on 18 Aug. 2017, and U.S. Provisional Application Ser. No. 62/692,512, filed on 29 Jun. 2018, each of which is incorporated in its entirety by this reference.

STATEMENT OF GOVERNMENT SUPPORT

This invention was made with government support under Award Number ARPA-E-DE-AR00000664 awarded by the Advanced Research Projects Agency-Energy. The government has certain rights in the invention.

TECHNICAL FIELD

This invention relates generally to the small-gap device field, and more specifically to a new and useful spacer system in the small-gap device field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System.

Figure 1A:
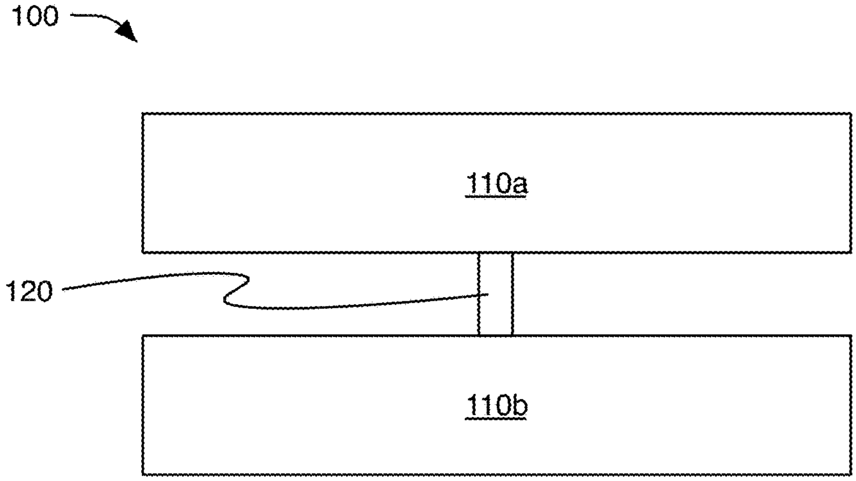
FIG. 1A is a side view of an embodiment of the system.
Figure 1B:
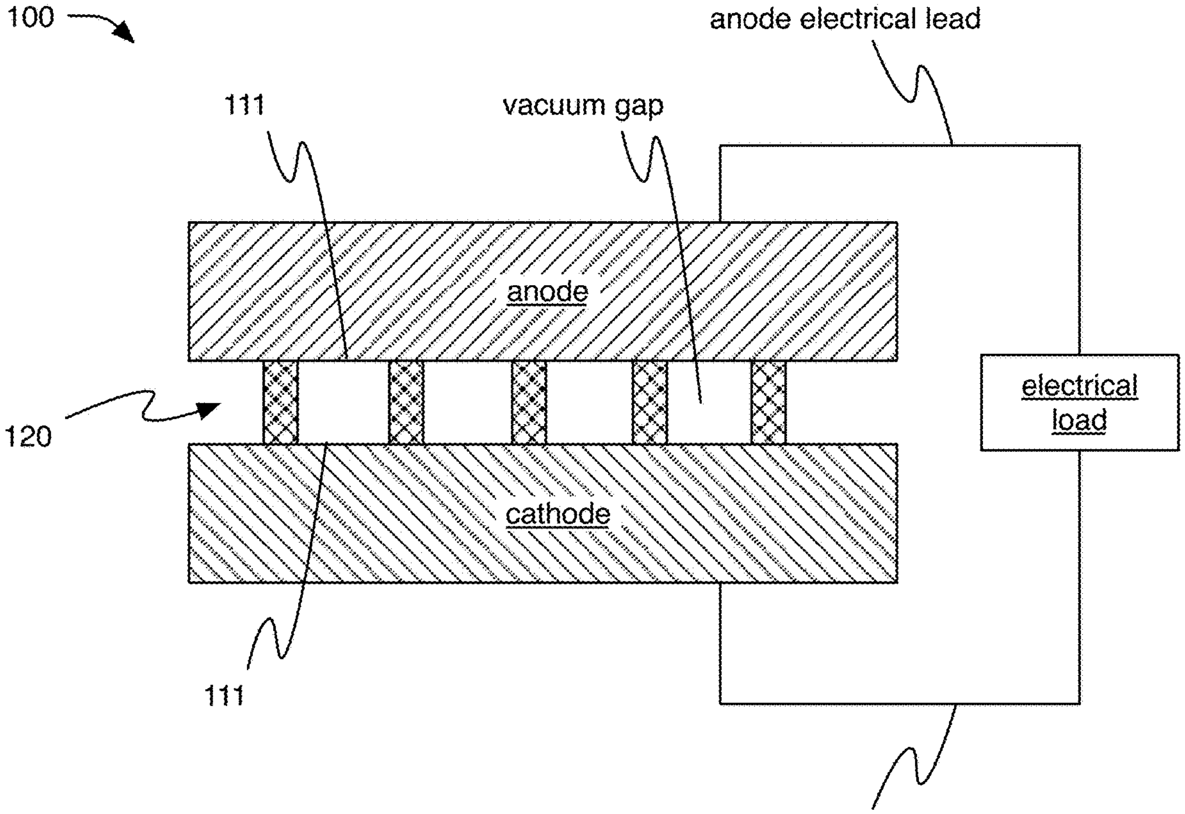
FIG. 1B is a cross-sectional side view of a variant of the embodiment.

A small-gap device system 100 preferably includes two or more electrodes 110 and one or more spacers 120. The electrodes 110 are preferably separated (e.g., defining a small inter-electrode gap, such as a micron-scale gap) by the spacer(s) 120, such as shown in FIGS. 1A-1B. However, system can additionally or alternatively include any other suitable elements, and the elements of the system can additionally or alternatively have any other suitable arrangement. The system can be fabricated as described below regarding the method of fabrication, and/or can be fabricated in any other suitable manner.

The system 100 preferably includes (or is part of) a thermionic energy converter (TEC). For example, the electrodes 110 can include a cathode (e.g., operable to emit electrons when at high temperature) and an anode (e.g., operable to collect electrons emitted by the cathode) separated by the spacer(s). However, the system can additionally or alternatively include (or be part of) a thermophotovoltaic device, microgap plasma device, bio-sensing and/or bio-manipulation device, and/or any other suitable type of device (e.g., devices that require and/or may benefit from a small gap, thermal isolation, and/or electrical isolation between the electrodes; other devices).

1.1 Materials.

The elements of the system can include (e.g., be made of) any suitable materials and/or combinations of materials. The materials can include semiconductors, metals, insulators, organic compounds (e.g., polymers, small organic molecules, etc.), and/or any other suitable material types.

The semiconductors can include group IV semiconductors, such as Si, Ge, SiC, and/or alloys thereof; III-V semiconductors, such as GaAs, GaSb, GaAs, GaP, GaN, AlSb, AlAs, AlP, AlN, InSb, InAs, InP, InN, and/or alloys thereof; II-VI semiconductors, such as ZnTe, ZnSe, ZnS, ZnO, CdSe, CdTe, CdS, MgSe, MgTe, MgS, and/or alloys thereof; and/or any other suitable semiconductors.

The metals can include alkali metals (e.g., Li, Na, K, Rb, Ce, Fr), alkaline earth metals (e.g., Be, Mg, Ca, Sr, Ba, Ra), transition metals (e.g., Sc, Ti, V, Cr, Mn, Fe, Co, Ni, Cu, Zn, Sn, Zr, Nb, Mo, Au, Ru, Rh, Pd, Ag, Cd, Hf, Ta, W, Re, Ir, Pt, Hg, Al, Si, In, Ga, Tl, Pb, Bi, Sb, Te, Sm, Tb, Ce, Nd), post-transition metals (e.g., Al, Zn, Ga, Ge, Cd, In, Sn, Sb, Hg, Tl, Pb, Bi, Po, At), metalloids (e.g., B, As, Sb, Te, Po), rare earth elements (e.g., lanthanides, actinides), synthetic elements (e.g., Am, Cm, Bk, Cf, Es, Fm, Md, No, Lr, Rf, Db, Sg, Bh, Hs, Mt, Ds, Rg, Cn, Nh, Fl, Mc, Lv, Ts), any other suitable metal elements, and/or any suitable alloys, compounds, and/or other mixtures of the metal elements.

The insulators can include any suitable insulating (and/or wide-bandgap semiconducting) materials. For example, insulators can include insulating metal and/or semiconductor compounds, such as oxides, nitrides, oxynitrides, fluorides, borides, and/or any other suitable compounds.

The elements of the system can include any suitable alloys, compounds, and/or other mixtures of materials (e.g., the materials described above, other suitable materials, etc.), in any suitable arrangements (e.g.; multilayers; superlattices; having microstructural elements such as inclusions, dendrites, lamina, etc.).

1.2 Electrodes.

Each electrode 110 preferably includes one or more inner surfaces 111 (e.g., wherein a first electrode 110*a* defines a first inner surface ma, and second electrode 110*b* defines a second inner surface 111*b*). The inner electrode surfaces are preferably substantially smooth and planar (e.g., the electrodes are flat, polished wafers), but can additionally or alternatively define any suitable shapes (e.g., non-planar, such as curved, terraced, etc.) and/or surface finishes (e.g., textured). The inner surfaces are preferably macroscopic (e.g., define a wafer-scale length scale and/or surface area), such as having lateral dimensions (e.g., diameter, radius, side length, diagonal length, etc.) equal to and/or greater than a threshold length (e.g., 1 mm, 5 mm, 10 mm, 20 mm, 25 mm, 51 mm, 76 mm, 100 mm, 125 mm, 130 mm, 150 mm, 175 mm, 200 mm, 300 mm, 450 mm, etc.). Each inner surface preferably faces an inner surface of another electrode (e.g., thereby defining the inter-electrode gap).

The electrodes are preferably electrically connected (or operable to be connected) by an electrical circuit, preferably including an electrical load (e.g., driven by electrical energy from the TEC). However, the electrodes can additionally or alternatively be electrically (and/or otherwise functionally) coupled in any other suitable manner (or can not be coupled).

Although the electrodes preferably include electrical conductors, a person of skill in the art will understand that variants of the system can additionally or alternatively include any other suitable device elements (e.g., flat and/or planar elements), having any suitable properties, arranged along with and/or in place of the electrodes. For example, an embodiment of the system (e.g., a thermophotovoltaic device embodiment) can include an optical emission element and a photovoltaic cell (e.g., in place of electrodes) separated by a spacer.

1.3 Spacer.

The spacer 120 (or spacers) preferably functions to maintain the inter-electrode gap (e.g., prevent contact between the inner surfaces of the electrodes), more preferably without providing significant thermal and/or electrical conduction between the electrodes (e.g., electrically and/or thermally isolating the first electrode from the second electrode). For example, the thermal conductance between the electrodes (e.g., total conductance, conductance attributable to the spacer, etc.) can be less than a threshold conductance (e.g., 1, 5, 10, 15, 20, 25, 35, 50, 75, 100, 250, 500, 1000, 1500, 2000, 5000, 0-1, 1-10, 10-100, 100-1000, or 1000-10,000 mW $cm^{-2}$ $K^{-1}$, etc.), preferably such that the spacers 120 can enable significant temperature differences between the electrodes during device operation. For example, the difference in temperature (e.g., inner surface average temperature, electrode average temperature, etc.) between the first and second electrode can be greater than a threshold amount (e.g., 50, 100, 150, 200, 250, 300, 400, 500, 10-50, 50-150, 150-250, 250-450, 450-650, or greater than 650° C., etc.) during operation. Low thermal and/or electrical conductance can arise due to spacer material properties, spacer dimensions, contact resistances, and/or any other suitable factors.

The spacer 120 preferably defines a high geometrical transparency (e.g., for a projection of the spacer onto an electrode along an electrode normal vector, the ratio of uncovered electrode area to total electrode area; for projections of the spacer and its convex hull onto the electrode along the electrode normal vector, one minus the ratio of the spacer projected area to convex hull projected area, wherein the ratio of the spacer projected area to convex hull projected area defines a filling fraction equal to one minus the geometric transparency; etc.), such as geometrical transparency greater than or equal to a threshold value (e.g., 99%, 98%, 95%, 90%, 85%, 75%, 65%, 50%, 99-100%, 97-99%, 93-97%, 85-93%, 70-85%, 50-70%, etc.), which can enable significant transport (e.g., of electrons, atoms, and/or light) between the electrodes (e.g., minimal transport reduction as compared with a spacer-free device). The spacer 120 is preferably arranged throughout the region of the inter-electrode gap (e.g., wherein a convex hull of the spacer occupies all, substantially all, or most of the overlapping area between the electrodes; wherein the convex hull occupies at least a threshold fraction of the overlapping area between the electrodes, such as 99%, 98%, 95%, 90%, 85%, 75%, 65%, 50%, 99-100%, 97-99%, 93-97%, 85-93%, 70-85%, 50-70%, etc.), but can alternatively be arranged within any suitable sub-regions of the gap (and/or have any other suitable arrangement within the system).

In some embodiments, significant forces may be exerted on the spacer 120 (e.g., compressive forces, such as compressive forces exerted substantially normal the inner surfaces), and the spacer 120 preferably withstands such forces. For example, some or all of the inter-electrode gap can be fluidly isolated from the ambient environment surrounding the system, and can be held at lower pressure than the ambient environment (e.g., can be a vacuum environment). In this example, significant pressure (e.g., substantially equal atmospheric pressure) may be exerted on the electrodes (e.g., if portions of the electrodes, such as an outer electrode surface opposing the inner electrode surface across the electrode, are exposed to the ambient environment) and, via the electrodes, on the spacer. Thus, in this example, the spacer 120 preferably withstands the forces (e.g., maintains the inter-electrode gap while subject to these forces, does not fracture under these forces, etc.). In some specific examples, the spacer 120 exhibits a non-linear (e.g., significantly super-linear) response to such compression (e.g., exhibiting a higher spring constant as compression increases); such a response can be exhibited, for example, due to spacer features such as sidewalls arranged at an oblique angle to the electrode inner surfaces, non-planar sidewalls (e.g., as described below regarding the non-linear sidewall cross-section) such as curved and/or kinked sidewalls (e.g., including multiple wall segments defining different angles with respect to the electrode inner surfaces), and/or any other suitable features.

Figure 2A:
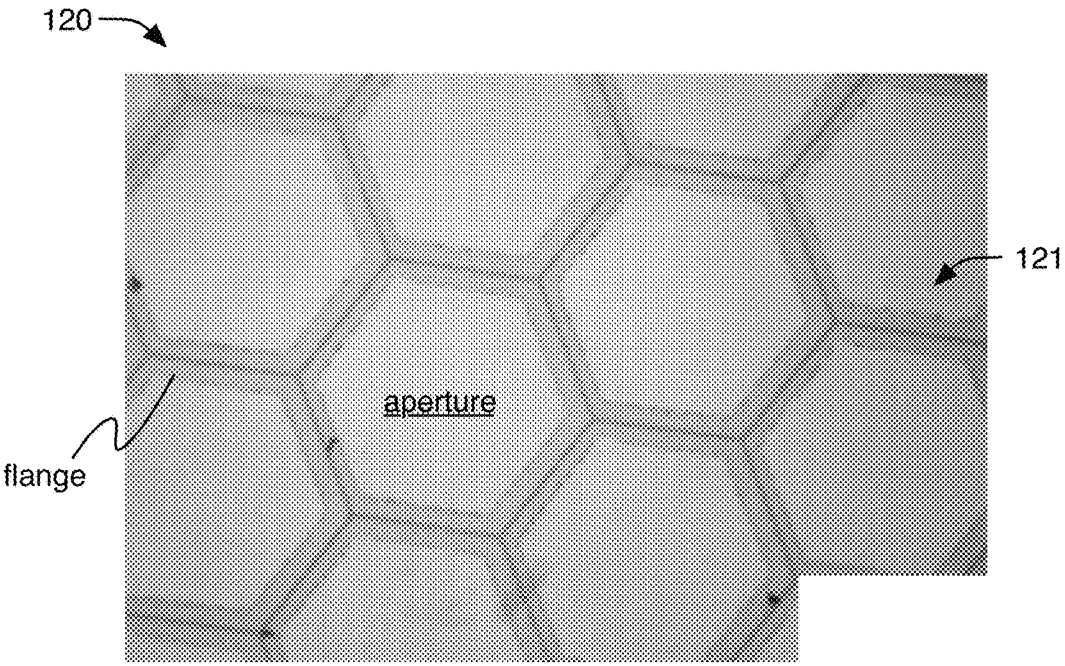
FIGS. 2A-2C, 3A-3D, and 4A-4C are plan views of various examples of a spacer of the system.
Figure 2B:
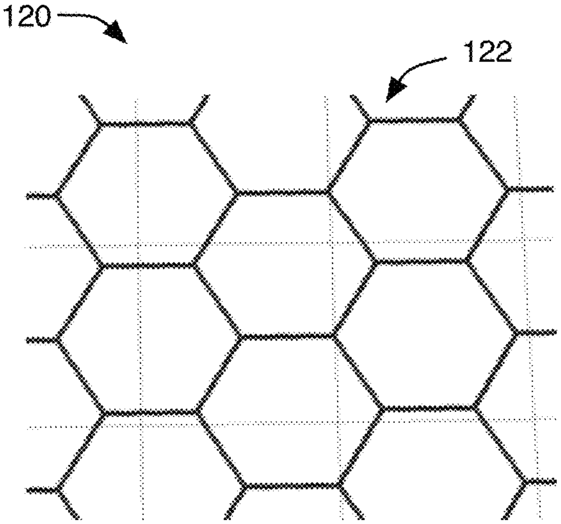
Figure 2C:
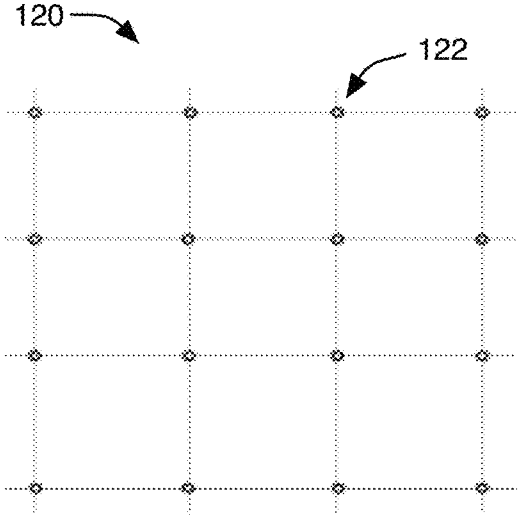
Figure 3A:
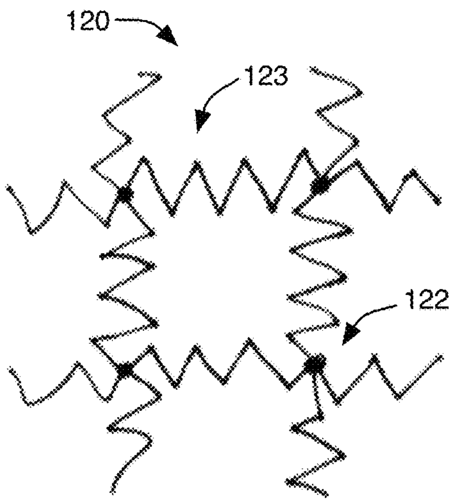
Figure 3B:
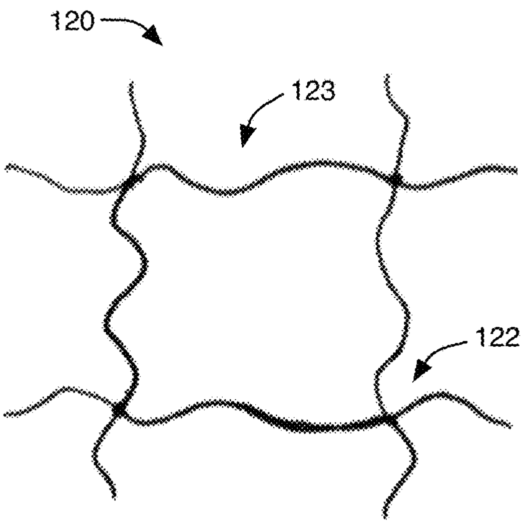
Figure 3C:
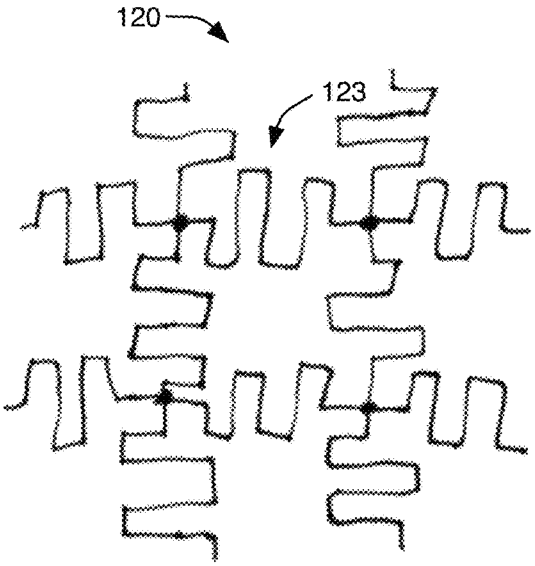
Figure 3D:
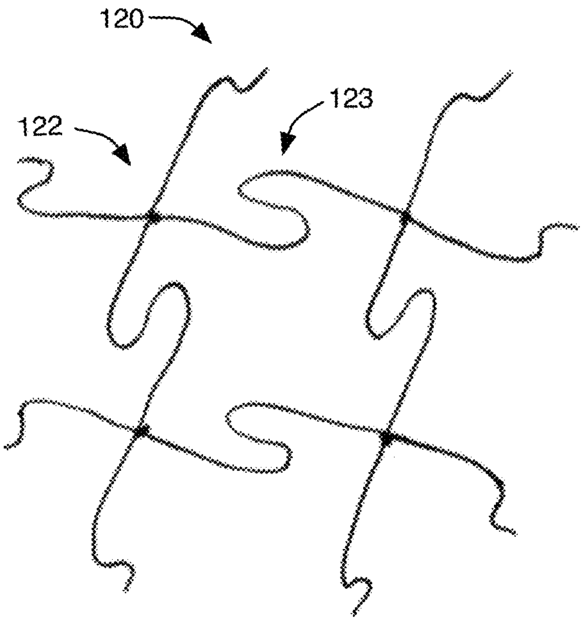

The spacer 120 preferably defines a continuous network (e.g., of elongated legs 121 connected at vertices 122) such as a mesh structure (e.g., including a set of vertices and a set of paths connected between vertices 122 of the set), more preferably forming a free-standing structure (e.g., structurally robust and/or manipulable without a support substrate). The spacer 120 (e.g., the vertices 122 and/or legs 121 of the spacer) preferably define (or substantially define) a lattice (e.g., 2-D lattice), such as an array of nodes (e.g., vertices 122, such as vertices defining regular and/or irregular polygons, such as hexagons, rectangles, triangles, etc.) connected by the legs 121 (e.g., as shown in FIGS. 2A-2C). However, the spacer 120 can alternatively define a non-periodic (e.g., aperiodic) tiling, an amorphous structure (e.g., having short-range order but lacking long-range order), a random structure, and/or any other suitable structure.

The spacer 120 preferably defines a plurality of apertures (e.g., between legs 121 of the spacer, such as shown in FIG. 2A), such as apertures for which a vector normal to a first electrode inner surface 111*a* pass through the aperture to the second electrode inner surface 111*b* without intersecting the spacer 120 (and preferably, without intersecting any other elements of the system). For example, high geometric transparency (e.g., as described above) can be achieved through a high ratio of aperture area to leg projected area.

The separation between spacer elements (e.g., legs 121, vertices 122, etc.) is preferably short enough to maintain inter-electrode spacing (e.g., maintain substantially uniform spacing, maintain spacing above a minimum threshold, prevent electrode-electrode contact, etc.) throughout the entire gap (e.g., despite potential inner electrode surface roughness, contamination, and/or non-planarity). For example, the elements can be arranged such that circles defined by the elements (e.g., inscribed circles) define diameters and/or radii smaller than a threshold length, and/or distances between vertices 122 (e.g., connected vertices) are less than the threshold length. The threshold length(s) can be absolute amounts (e.g., 0.01 mm, 0.05 mm, 0.1 mm, 0.2 mm, 0.3 mm, 0.4 mm, 0.5 mm, 0.75 mm, 1 mm, 2 mm, 5 mm, etc.), can be defined relative to (e.g., be a percentage of, such as 0.1%, 1%, 2%, 5%, 10%, 20%, 25%, 50%, 100%, 200%, 300%, 500%, 1000%, 5000%, 25,000%, 0.01-0.1%, 0.1-1%, 1-10%, 10-100%, 100-1000%, 1000-10,000%, 10,000-100, 000%, etc.) a characteristic dimensions of the system (e.g., spacer dimensions, such as height, width, wall thickness, etc.; electrode dimensions, such as diameter, roughness, flatness, etc.), and/or can be defined in any other suitable manner.

The legs 121 are preferably substantially non-linear, but can alternatively be linear. The leg(s) can extend along a non-linear path within a plane parallel the first and/or second surfaces (e.g., be non-linear along a lateral or x-y plane); extend along a non-linear path out-of-plane with the plane (e.g., wherein the plane is parallel the first and/or second surfaces; wherein the path can intermittently intersect the plane; wherein the legs 121 can be non-linear in an x-z plane and/or y-z plane; etc.); be non-linear in any suitable plane(s) and/or with respect to any suitable axes; and/or be otherwise non-linear.

The legs 121 preferably define non-linear (e.g., circuitous) paths 123 between the vertices 122 (e.g., as shown in FIGS. 3A-3D), more preferably substantially non-linear paths, such as paths defining lengths substantially greater than the linear distance between the path endpoints (e.g., as described below regarding the path length and segment length), and/or paths with curved (e.g., arcuate) elements defining radii of curvature less than a threshold radius (e.g., 1 μm, 5 μm, 10 μm, 15 μm, 22.5 μm, 30 μm, 45 μm, 60 μm, 80 μm, 100 μm, 125 μM, 150 μm, 200 μm, 250 μm, 10-30 μM, 25-75 μm, 70-150 μm, 125-300 μm, greater than 300 μm, less than 1 μm, etc.) and/or defined over more than a threshold arc angle (e.g., 5°, 10°, 20°, 30°, 45°, 60°, 75°, 90°, 100°, 110°, 120°, 130°, 140°, 150°, 160°, 170°, 180°, 45-75°, 60-100°, 90-150°, 130-180°, greater than 180°, less than 45°, etc.). For example, a leg 121 connecting two vertices preferably defines a path length (and/or a projected length of a projection of the path onto a reference plane, such as the lateral and/or normal plane described below) that is substantially longer than the segment length of a straight segment between the vertices, such as a path length that is at least a threshold factor (e.g., 1.01, 1.05, 1.1, 1.25, 1.5, 2, 3, 5, 10, 1-1.05, 1.05-1.1, 1.1-1.2, 1.2-1.5, 1.5-2, 2-5, 5-10, or greater than 10) greater than the segment length. The paths 123 preferably include lateral features (e.g., defined such that a projection of the path onto a lateral plane parallel an electrode inner surface is substantially non-linear, such as the features being defined substantially within the lateral plane) and can additionally or alternatively include out-of-plane features (e.g., defined such that, for a normal plane substantially normal an electrode inner surface and including the straight segment between vertices, a projection of the path onto the plane is substantially non-linear, such as the features being defined substantially within the plane) and/or any other suitable features. The features can include substantially linear features, curved features, angled features, and/or any other suitable features. The paths 123 can be (or include segments that are) curved, serpentine, boustrophedonic, wavy, helical, meandering, angled, crenate, and/or crenellated, and/or can have any other suitable (e.g., substantially non-linear) shape(s).

Figure 4A:
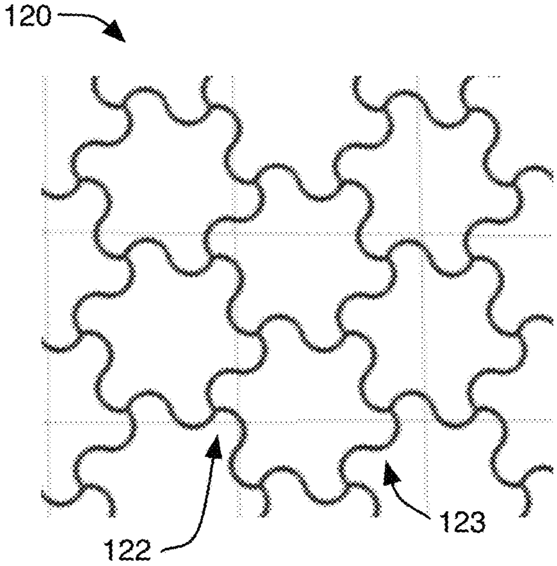
Figure 4B:
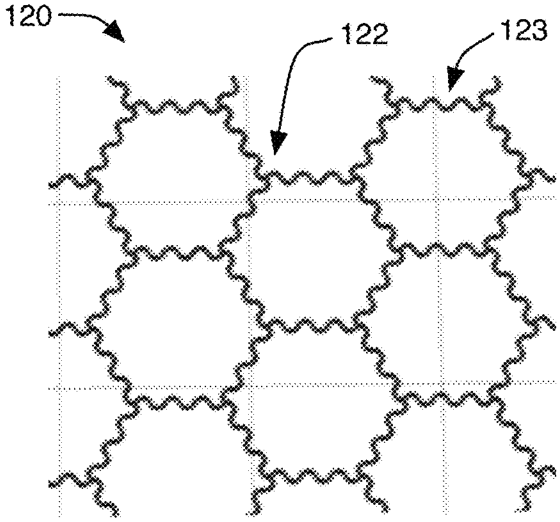
Figure 4C:
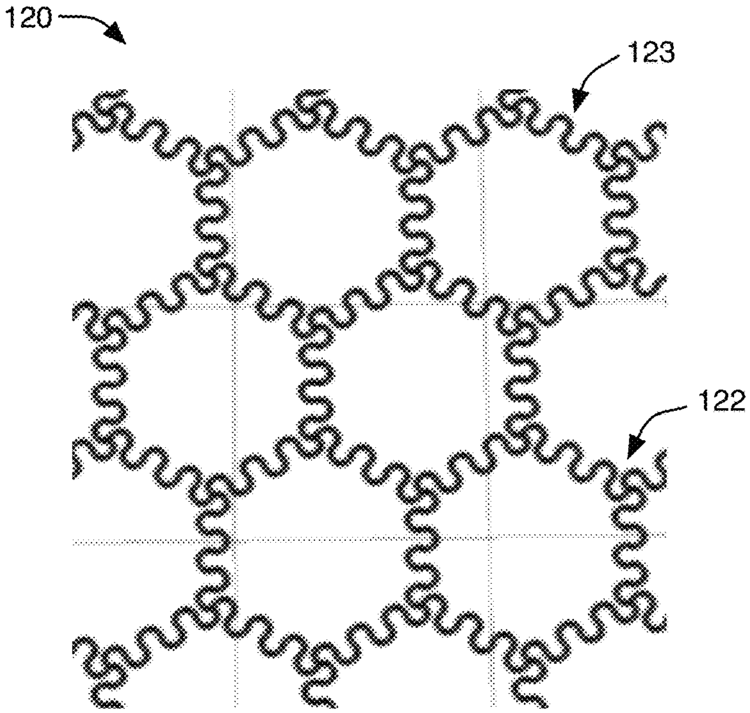

In one example (e.g., as shown in FIGS. 4A-4C), the paths 123 each include a series of circular arcs with alternating curvature directions (preferably lateral curvature, but additionally or alternatively including out-of-plane curvature), preferably connected at their endpoints (e.g., each endpoint lying on a line between the vertices 122) but alternatively separated from each other, such as being connected via straight segments and/or any other suitable segments. The circular arcs can have any suitable radius of curvature (e.g., 1 μm, 5 μm, 10 μm, 15 μm, 22.5 μm, 30 μm, 45 μm, 60 μm, 80 μm, 100 μm, 125 μm, 150 μm, 200 μm, 250 μm, 10-30 μm, 25-75 μm, 70-150 μm, 125-300 μm, greater than 300 μm, less than 1 μm, etc.), any suitable arc angle (e.g., 5°, 10°, 20°, 30°, 45°, 60°, 75°, 90°, 100°, 110°, 120°, 130°, 140°, 150°, 160°, 170°, 180°, 45-75°, 60-100°, 90-150°, 130-180°, greater than 180°, less than 45°, etc.), and/or any other suitable metrics.

The non-linear and/or circuitous paths preferably function to increase lateral (e.g., parallel an inner electrode surface) compliance of the legs, which can enhance spacer robustness to thermal cycling (e.g., robustness to thermal expansion and/or contraction occurring during thermal cycling), such as repeated cycling between high temperatures (e.g., greater than 600° C., 700° C., Boo ° C., 1000° C., 1200° C., 1400° C., 500-750° C., 750-1000° C., 1000-1250° C., 1250-1500° C., etc.) and reduced temperatures (e.g., ambient temperatures; temperatures less than 800° C., 600° C., 400° C., 300° C., 200° C., 100° C., 50° C., 0-100° C., 100-300° C., 300-600° C., 600-1000° C., etc.). The circuitous paths can additionally or alternatively function to increase normal (e.g., normal the inner electrode surface) strength (e.g., under forces such as described above), such as by increasing a buckling threshold of the legs. However, the spacer 120 can additionally or alternatively include straight legs 121 directly connecting the vertices 122, and/or legs 121 defining any other suitable paths.

The legs 121 preferably define a substantially consistent cross-section (e.g., on planes normal the path defined by the leg) along their length (and from leg to leg), but can alternatively define cross-sections that change (e.g., gradually, in steps, etc.) along the length of the leg and/or between different legs, and/or can define any other suitable cross-section(s). Each leg 121 can be solid, porous, include geometric voids (e.g., lumens), form a matrix, or be otherwise constructed. The leg internal structure can be consistent or variable through the leg length, width, and/or height.

Figure 5A:
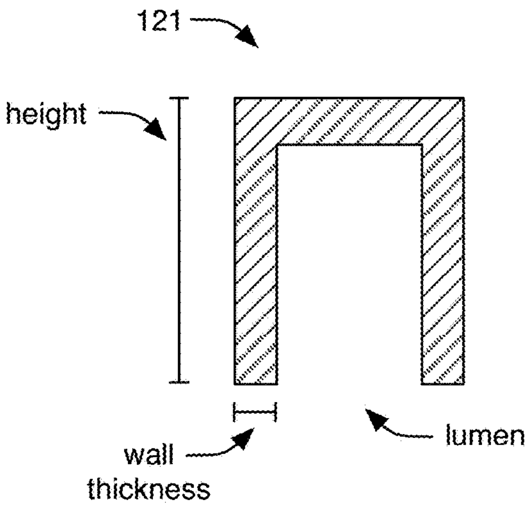
FIGS. 5A-5P are cross-sectional side views of various examples of a leg of the spacer.
Figure 5B:
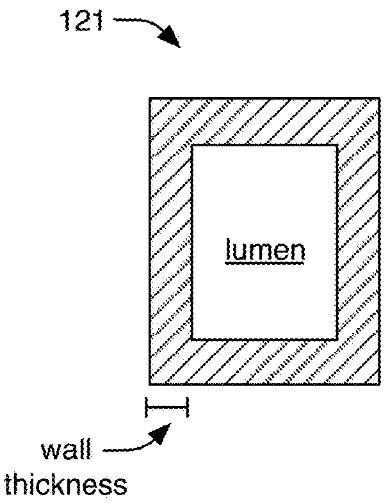
Figure 5C:
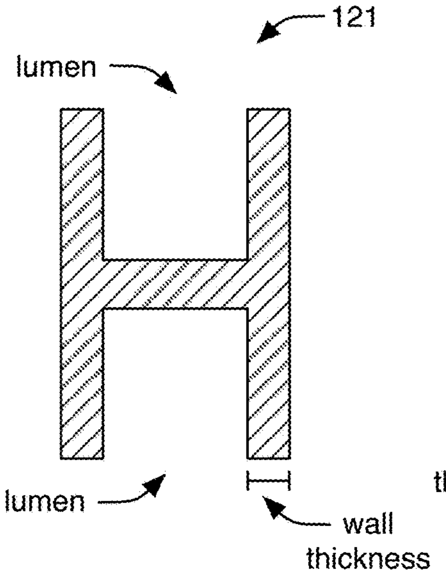
Figure 5D:
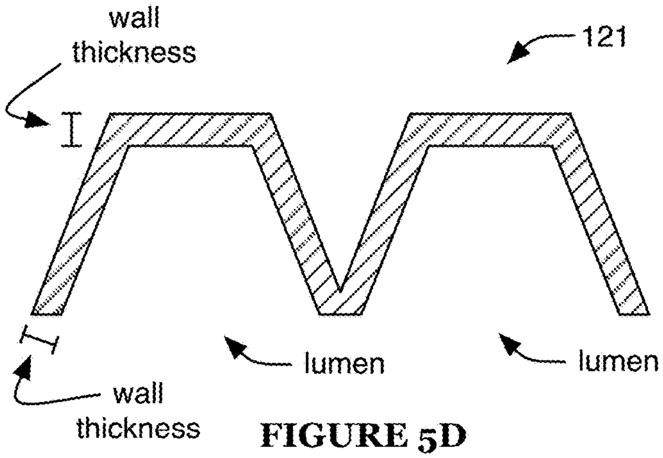
Figure 5E:
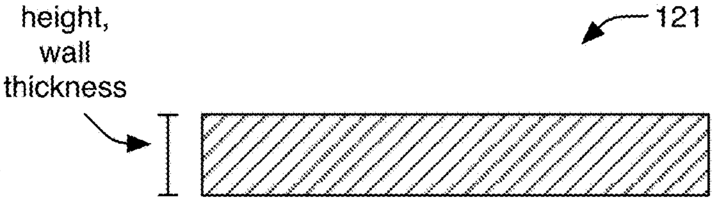
Figure 5F:
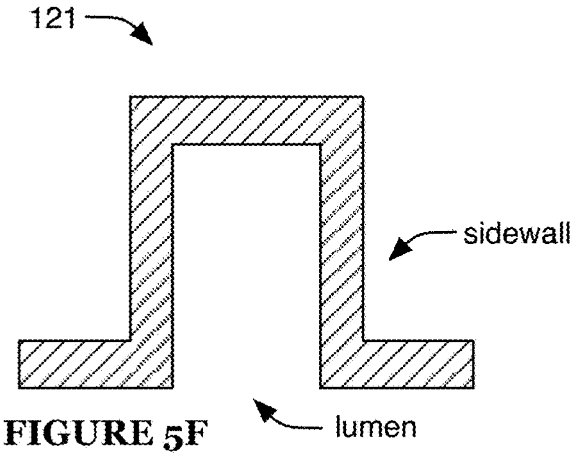
Figure 5G:
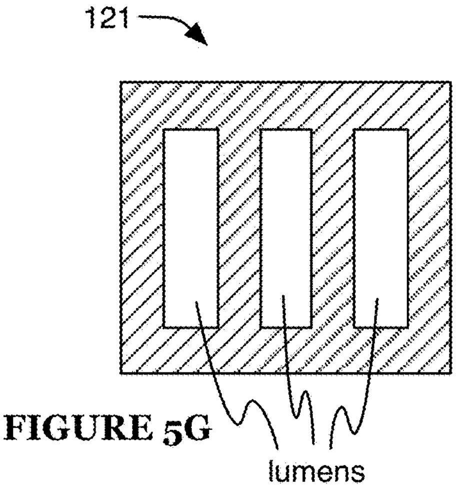

The leg cross-section(s) (e.g., in a plane perpendicular the inner electrode surface, such as a plane normal the path defined by the leg) can have any suitable shape. In a first embodiment, the cross-section is substantially rectangular (e.g., as shown in FIGS. 1B and 5E). In a second embodiment, the cross-section defines one or more lumens (e.g., as shown in FIGS. 5A-5D and 5F-5P). For example, the cross-section can define one or more vertical features (e.g., features configured to contact the electrode inner surfaces at each end, such as vertical walls spanning the spacer height), troughs (e.g., troughs of: C- or U-sections; H- or I-sections; corrugated, serpentine, wavy, crenate, and/or crenulate sections; etc.), holes (e.g., holes in tubes, such as rectangular and/or round tubes; rectangular and/or round holes; etc.), flanges (e.g., extending outward from a vertical spacer feature, such as extending along an electrode surface), and/or any other suitable features. The cross-section can define one or more spacer heights, leg (and/or leg feature) widths, wall thicknesses, and/or any other suitable metrics.

Thus, the spacer 120 preferably includes a set of legs defined along a set of paths (e.g., each leg 121 defined along a different path), wherein each leg 121 of the set (and/or any subset thereof) preferably defines one or more lumens, such as troughs and/or tubes (e.g., wherein the leg 121 is canaliculate and/or tubular), and can additionally or alternatively define any other suitable features. A lumen of a leg (e.g., defined by a first member of the leg, such as a member arranged closest to and/or contacting a first electrode inner surface) is preferably defined along (e.g., along the entire length of) the associated path (e.g., wherein the path is centered within the lumen). For example, a leg 121 can include a first portion arranged proximal (e.g., in contact with) the first electrode inner surface, a second portion arranged proximal (e.g., in contact with) the second electrode inner surface, and one or more sidewalls connecting the first portion to the second portion (and/or connecting the first and/or second portion to a third portion arranged opposing the first or second portion across the lumen), preferably wherein the sidewall and the second portion cooperatively define the first lumen and the second portion is arranged between the first lumen and the second electrode inner surface. In some specific examples (e.g., as shown in FIGS. 5L-5P), a cross-section of the sidewall(s), defined on a plane normal the first path, is substantially non-linear between the first and second portion (e.g., is curved, includes multiple line segments at different angles, etc.), which may result in a non-linear response to compressive forces exerted on the spacer.

Figure 10A:
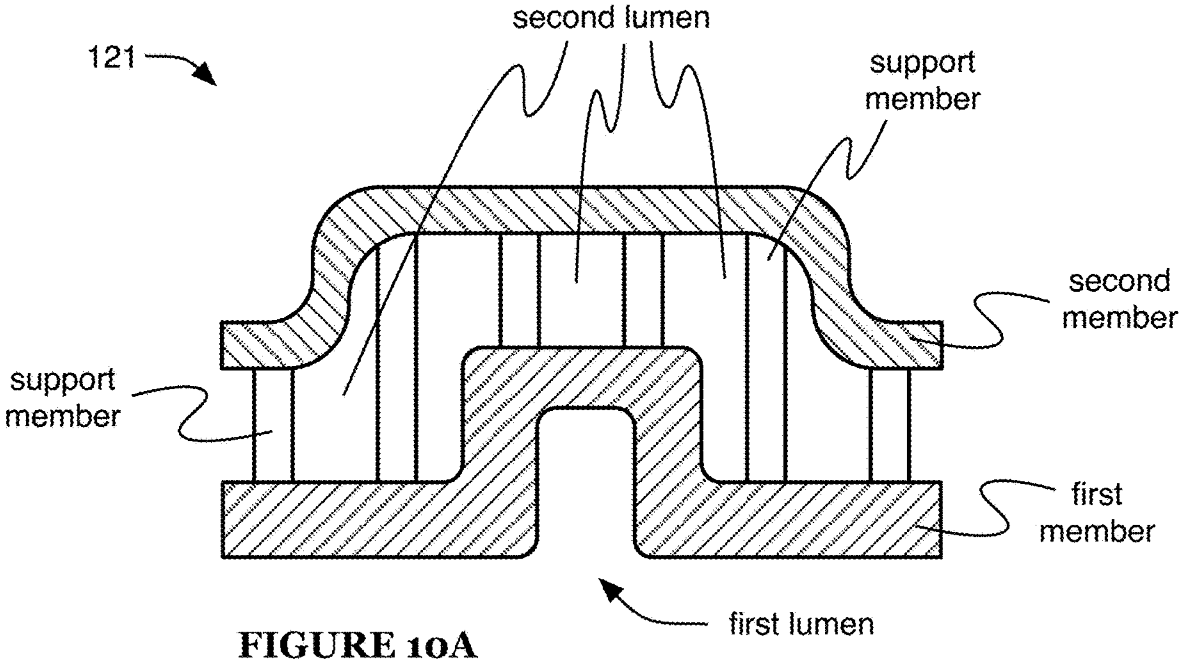
FIG. 10A-10B are cross-sectional side views of various examples of a leg of the spacer.
Figure 10B:
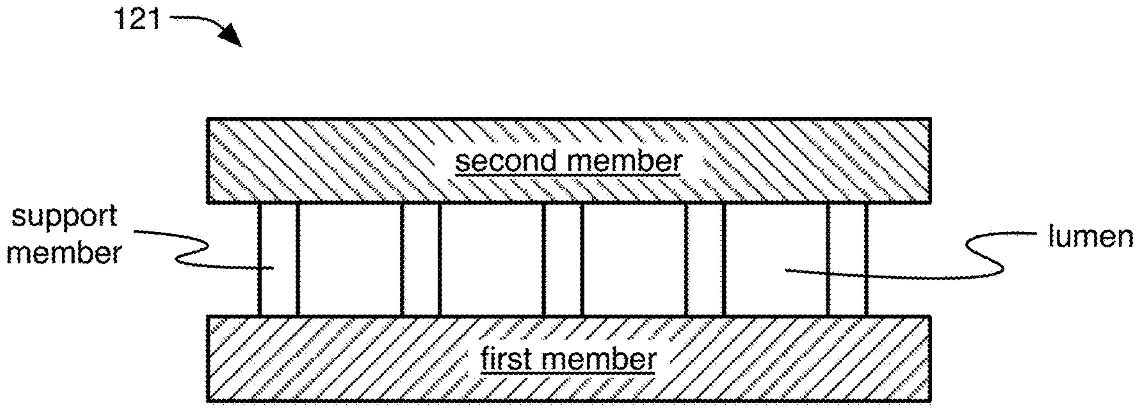
Figure 11A:
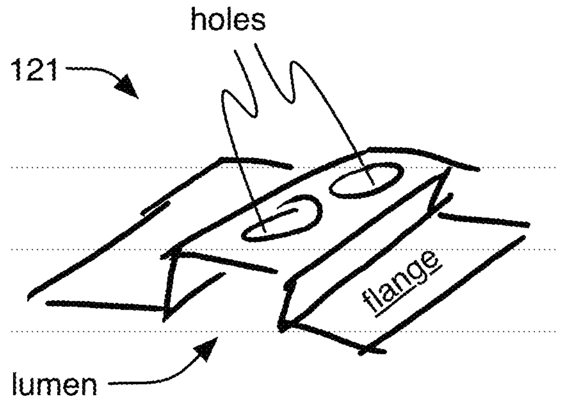
FIGS. 11A-11D are perspective views of various examples of a leg of the spacer.
Figure 11B:
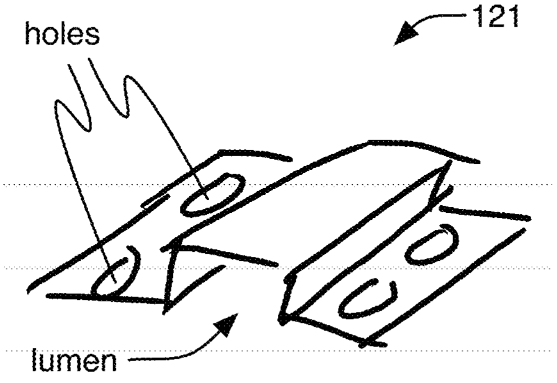
Figure 11C:
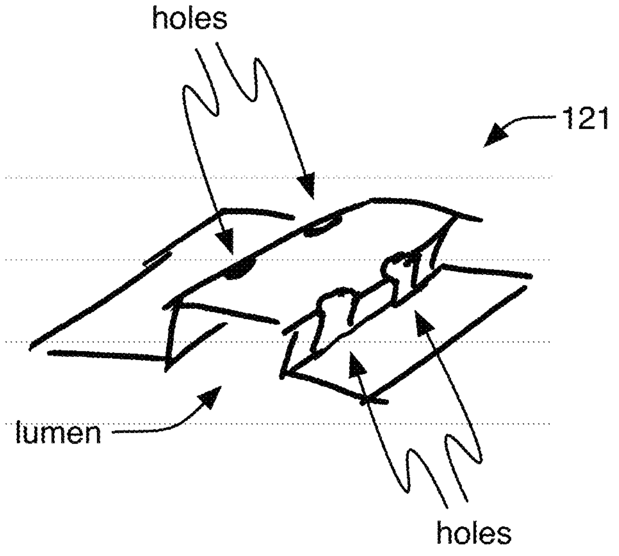
Figure 11D:
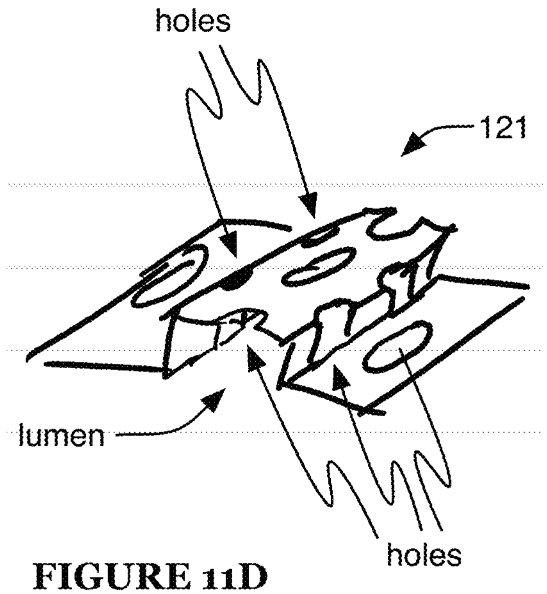

In some variations (e.g., as shown in FIGS. 5K, 9, and 10A-10B), the leg 121 includes a second member (e.g., connected to the first member, such as along the length of the first member and/or along a subset thereof), which is preferably arranged farther from the first electrode than the first member (e.g., arranged closest to and/or contacting a second electrode inner surface). The second member can optionally define a second lumen (e.g., cooperatively with the first member), wherein the first lumen is preferably substantially separated from the second lumen (e.g., by the first member). The second leg (e.g., the second lumen) is preferably defined along a second path based on the first path (e.g., substantially identical to an offset version and/or geometric translation of the first path, such as a translation from the first lumen to the second lumen) but can alternatively be defined along any other suitable path. In some examples (e.g., as shown in FIGS. 10A-10B), the leg 121 includes one or more support members (e.g., arranged within the second lumen), such as tubes and/or columns (e.g., positioned at various locations, such as a periodic positions, along the length of the leg, rather than forming continuous walls along the entire length of the leg) substantially oriented along an axis normal to the spacer and/or to the electrode inner surface, wherein each support member preferably connects the first member to the second member and/or provides mechanical support for the leg 121 in any other suitable manner.

Figure 12A:
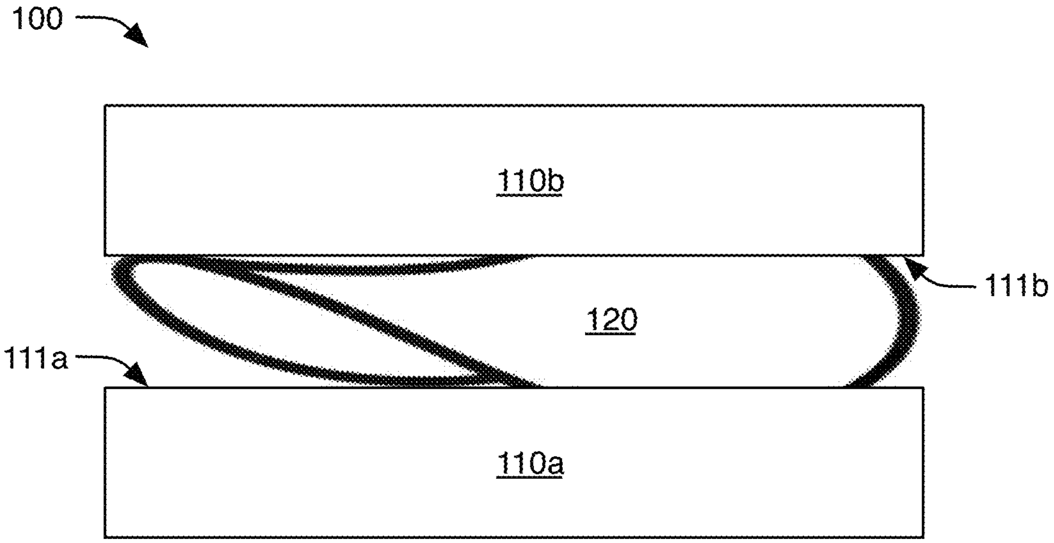
FIGS. 12A-12B are side views of various examples of the system.
Figure 12B:
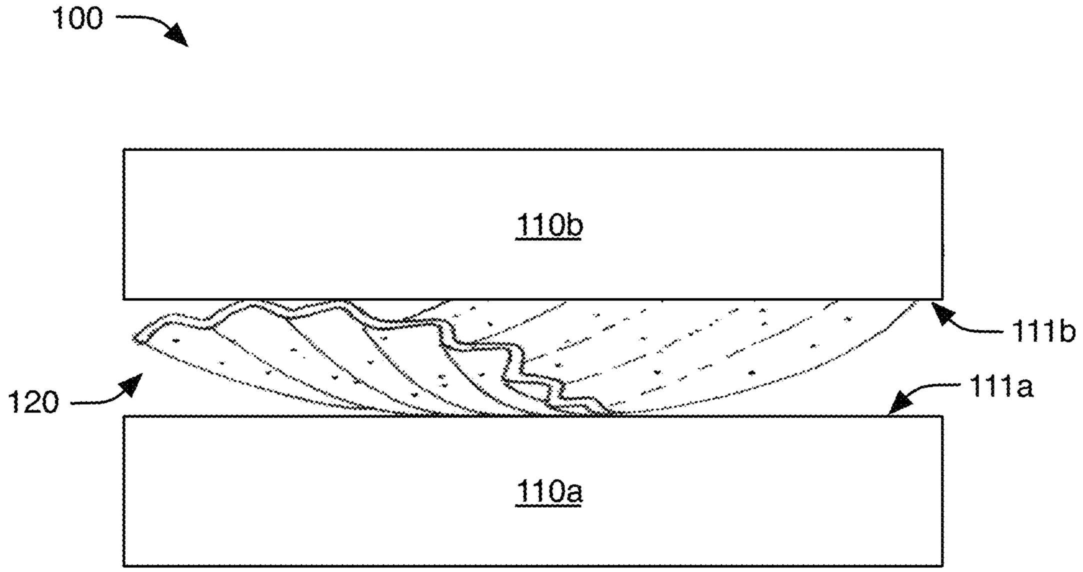

In some embodiments (e.g., in which a leg 121 contacts the inner surface of both electrodes, such as in which the spacer 120 is substantially planar), the leg height (or, for changing cross-sections, largest leg height) preferably functions to define the inter-electrode spacing (e.g., the spacer height, or sum of heights of stacked spacers, is substantially equal to the spacing). In other embodiments (e.g., in which the spacer is substantially non-planar, such as shown in FIGS. 12A-12B), the overall spacer height (preferably under compression but alternatively free-standing) preferably functions to define the inter-electrode spacing (e.g., is substantially equal to the spacing). The inter-electrode spacing (e.g., inter-electrode gap width; preferably defined by the spacer height and/or leg height, etc.) is preferably 0.1-10 μm, more preferably 0.5-3 μm (e.g., 0.75 μm, 1 μm, 2 μm, etc.), but can alternatively be 50-100 nm, less than 50 nm, 10-25 μm, 25-50 μm, greater than 50 μm, or any other suitable height. The leg width and leg feature widths are preferably micron scale (e.g., 1-10 μm, 10-100 μm, etc.), but can additionally or alternatively be 100 nm-1 μm, less than 100 nm, greater than 100 μm, and/or be any other suitable widths. In some embodiments (e.g., in which the leg cross-section is substantially rectangular, such as shown in FIG. 5E), the spacer height is equal (or substantially equal) to the wall thickness.

The cross-section preferably defines a substantially uniform wall thickness (e.g., arising from deposition by a substantially conformal technique, such as atomic layer deposition), but can alternatively define any suitable wall thicknesses (e.g., disparate wall thicknesses, gradually varying wall thicknesses, etc.). The wall thickness can be 10-800 nm (e.g., 10-30 nm, 25-75 nm, 75-250 nm, 250-800 nm, less than 100 nm, etc.), greater than 800 nm, less than 10 nm, and/or any other suitable thickness.

Figure 6A:
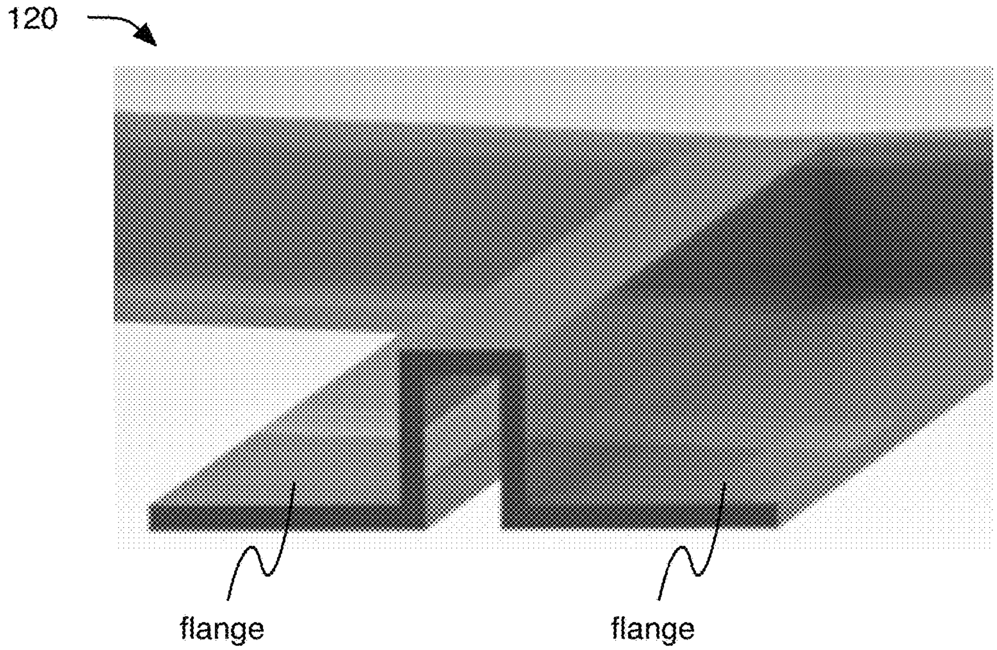
FIG. 6A is a cross-sectional perspective view of a specific example of the spacer.
Figure 6B:
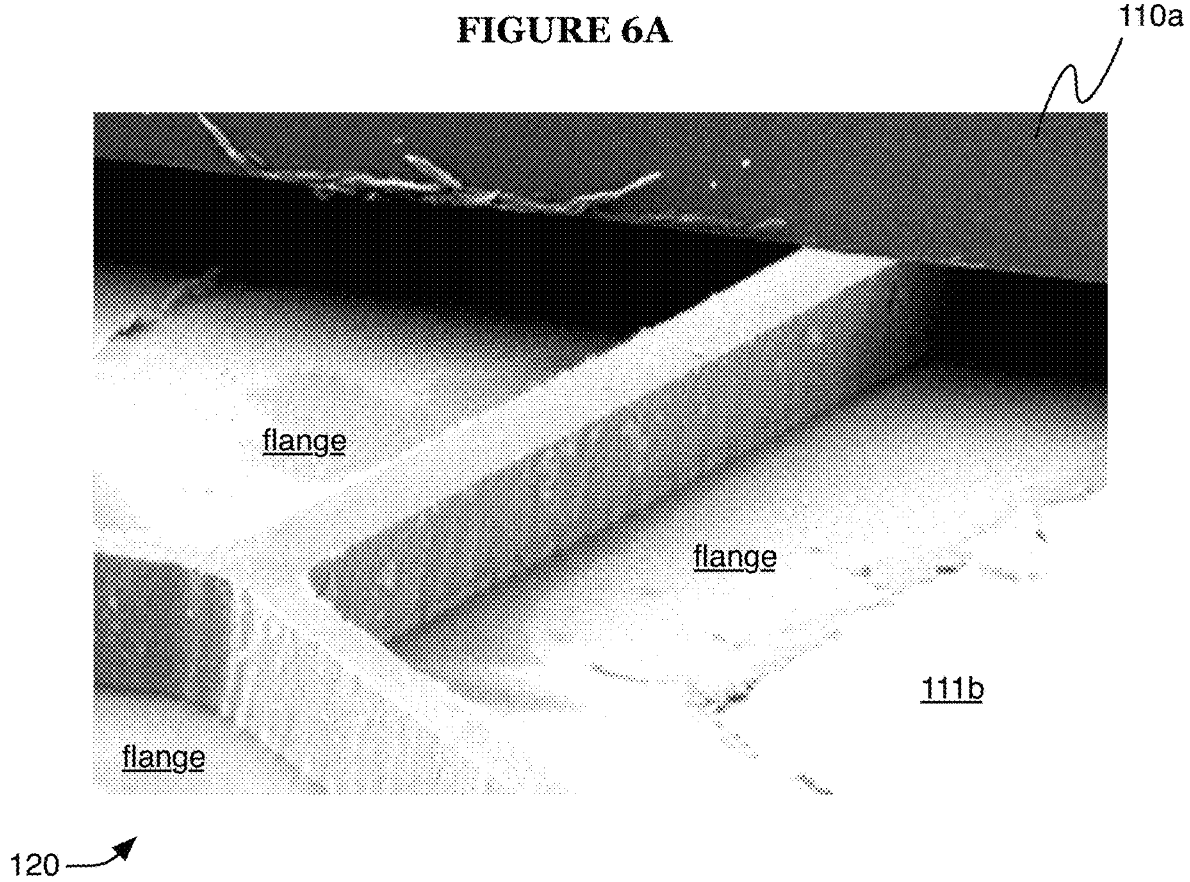
FIG. 6B is a perspective view of a specific example of the spacer arranged between two electrodes.

In one embodiment, the legs 121 define a substantially consistent cross-section, which defines a substantially uniform wall thickness, includes a single U-section rib, and optionally includes a flange on one or both sides of the rib (e.g., as shown in FIG. 6A-6B). In a specific example of this embodiment, the wall thickness is 100 nm, the leg height (defined by the rib) is 750 nm, the rib width is 1.5 μm, and the flanges are less than 5 μm wide.

Figure 5H:
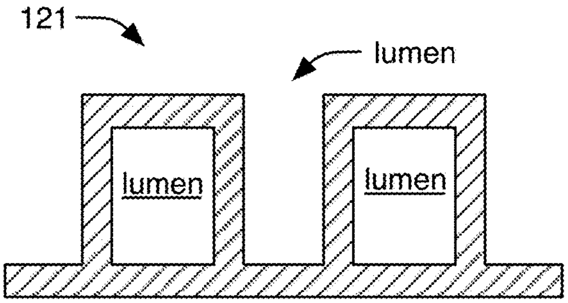
Figure 5I:
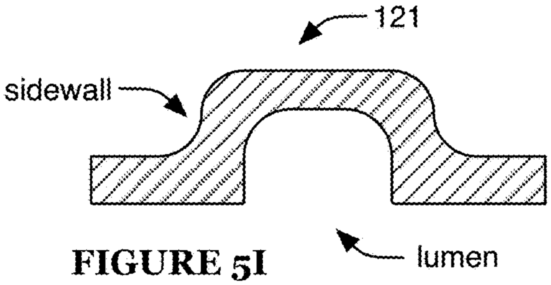
Figure 5J:
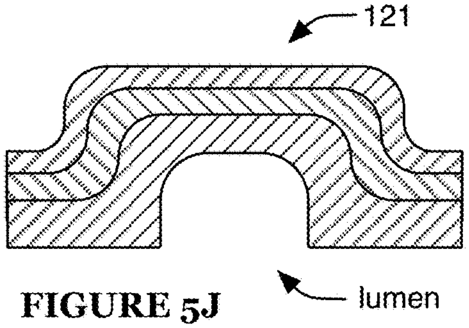
Figure 5K:
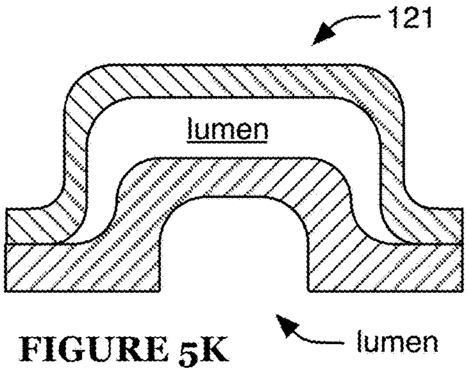
Figure 5L:
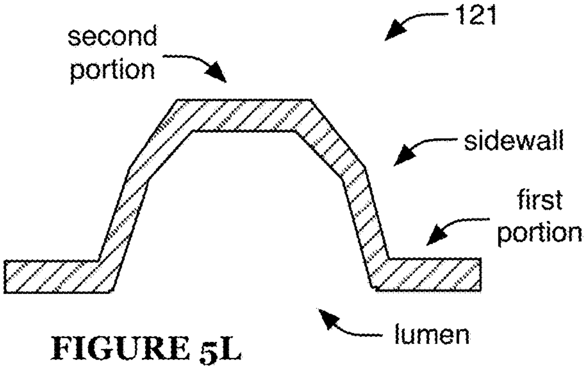
Figure 5M:
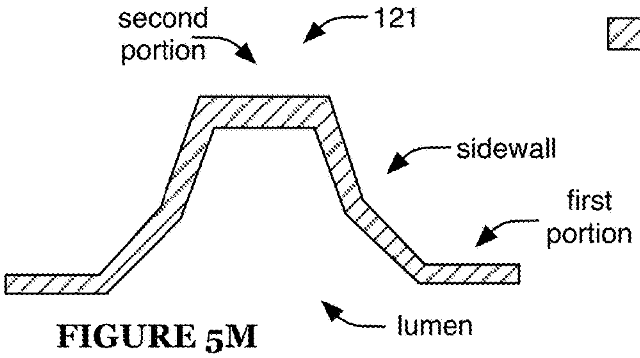
Figure 5N:
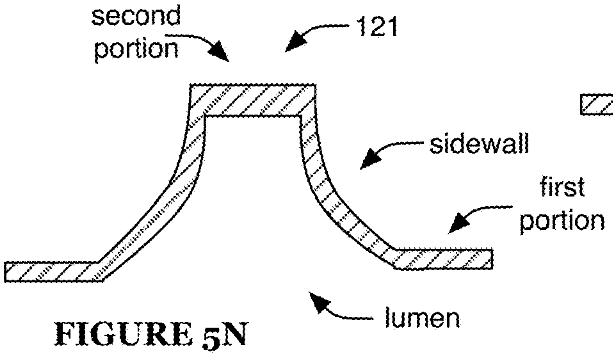
Figure 5O:
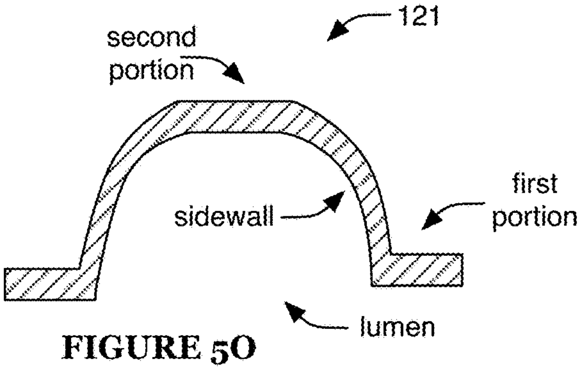
Figure 5P:
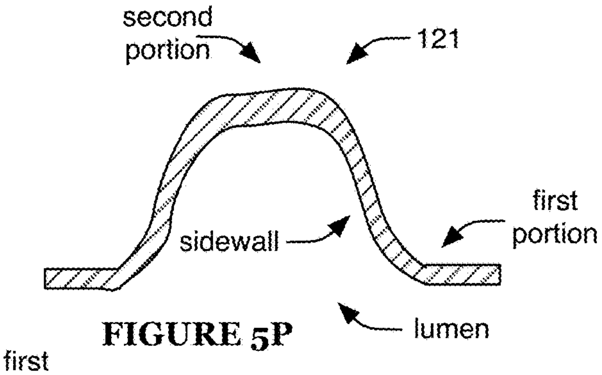

In a second embodiment, the legs 121 define a stepped cross-section, wherein the leg 121 includes a substantially planar member along its entire length, and includes protrusions (e.g., box-like protrusions, such as shown in FIG. 5H), along portions of its length (e.g., periodically along its length, such as occupying 50% of the length). However, the legs 121 can define any other suitable cross-sections.

In some embodiments, the spacer 120 (e.g., one or more of the legs 121) can include features that cause spacer contact points with the first electrode inner surface to be significantly offset (e.g., in a lateral direction) from spacer contact points with the second electrode inner surface, such as offset by more than a threshold distance (e.g., 10 nm, 50 nm, 100 nm, 500 nm, 1000 nm, 5000 nm, 0.01 mm, 0.05 mm, 0.1 mm, 0.2 mm, 0.3 mm, 0.4 mm, 0.5 mm, 0.75 mm, 1 mm, 2 mm, 5 mm, 10-100 nm, 100-1000 nm, 1-10 μm, 10-100 μm, 0.1-1 mm, 1-10 mm, etc.). This can, for example, increase the effective path length for thermal transport through the spacer, thereby increasing the inter-electrode thermal isolation. In a first example, such separation is achieved via spacer roughness (e.g., random or pseudo-random roughness, such as roughness templated from the surface roughness of a fabrication substrate, and/or roughness achieved by roughening the fabricated spacers, such as via an etching process), such as roughness greater and/or less than a threshold value (e.g., 0.1, 0.5, 1, 5, 10, 20, 30, 50, 75, 100, 125, 150, 200, 300, 0.1-1, 1-10, 10-25, 25-65, 65-100, 100-150, 150-200, and/or 200-400 nm rms roughness). In a second example, the spacer 120 includes specifically-engineered contact points (e.g., protrusions in portions of the spacer facing each electrode inner surface, preferably wherein a protrusion from one side of the spacer, such as a side facing the first electrode inner surface, opposes a complementary depression in an opposing side of the spacer, such as a side facing the second electrode inner surface). The protrusions can include protrusions with sizes (e.g., length, width, diameter, etc.) substantially greater than (e.g., by at least a threshold factor, such as 1.1, 1.5, 2, 2.5, 3, etc.), similar to (e.g., within the threshold factor), and/or substantially less than (e.g., by at least the threshold factor) one or more characteristic sizes (e.g., width, height, wall thickness, length, etc.) of the legs of the spacer. In a specific example, the spacer 120 includes protrusions (and complementary depressions) templated from topographical features patterned into the fabrication template, such as protruding and/or recessed points, lines, mesas, ridges, and/or any other suitable topographical features.

Additionally or alternatively, each leg 121 can optionally define one or more holes (e.g., as shown in FIGS. 11A-11D), preferably holes oriented substantially normal to the spacer, such as holes through the sidewalls, top portions, flanges, and/or any other suitable structures of the leg. The spacer 120 (e.g., the legs 121) can additionally or alternatively include hollow features, such as stacks of multiple leg members defining multiple lumens (e.g., as shown in FIGS. 5I-5K and 9). The spacer 120 can optionally define a substantially non-planar shape (e.g., wherein the mesh structure is defined on a non-planar surface, such as wherein the vertices 122 are substantially non-coplanar), such as a curved surface (e.g., saddle shape, such as a hyperbolic paraboloid; cupped shape, such as an elliptic paraboloid; dimpled shape, such as a substantially planar region deformed by a cupped depression; trough-like shape, such as a cylindrical section or parabolic trough; etc.) and/or angled surface. In a specific example, the spacer 120 defines a rugose (e.g., corrugated, wrinkled, etc.) saddle-like surface, wherein the vertices 122 lie on the surface (e.g., and the paths 123 and/or legs 121 lie substantially on the surface). However, the spacers 120 can additionally or alternatively include any other suitable features for reducing thermal transport between the electrodes.

The spacers 120 preferably include (e.g., are made of) one or more thermally and/or electrically insulating materials. The materials can include oxide compounds (e.g., metal and/or semiconductor oxides) and/or any other suitable compounds, such as metal and/or semiconductor nitrides, oxynitrides, fluorides, and/or borides. For example, the materials can include oxides of Al, Be, Hf, La, Mg, Th, Zr, W, and/or Si, and/or variants thereof (e.g., yttria-stabilized zirconia). The spacer materials are preferably substantially amorphous, but can additionally or alternatively have any suitable crystallinity (e.g., semi-crystalline, nano- and/or micro-crystalline, single-crystalline, etc.). However, the spacers 120 can additionally or alternatively include any other suitable materials (e.g., as described above regarding materials).

The spacers 120 preferably include a combination of two or more materials (e.g., enabling material property tuning, protection of less robust materials, etc.), but can alternatively include a single material. The material combinations can include alloys, mixtures (e.g. isotropic mixtures, anisotropic mixtures, etc.), multilayer stacks, and/or any other suitable combinations. For example, multilayer stacks can reduce thermal and/or electrical conductions (e.g., due to carrier boundary scattering), and/or can increase spacer robustness (e.g., at high temperature, in chemically-reactive environments, etc.), such as by partially or entirely encapsulating less robust materials within more robust material layers. In a first specific example, the spacers 120 are made of a hafnia aluminate alloy. In a second specific example, the spacers 120 include a multilayer (e.g., three-layer) structure, with an intermediary layer (e.g., including alumina or an alumina-containing compound, such as a hafnia-alumina alloy; including hafnia or a hafnia-containing compound, such as a hafnia-alumina alloy; preferably consisting essentially of this material) in between (e.g., substantially encapsulated between) two outer layers (e.g., including hafnia or a hafnia-containing compound, such as a different hafnia-alumina alloy than the intermediate layer; including alumina or an alumina-containing compound, such as a different hafnia-alumina alloy than the intermediate layer; preferably consisting essentially of this material), the two outer layers having the same or different materials as each other, which can function, for example, to reduce evaporation and/or crystallization of species in the intermediary layer (e.g., Al, Hf, etc.) at high temperatures. In this second specific example, the first outer layer preferably contacts the first electrode inner surface, and the second outer layer preferably contacts the second electrode inner surface.

Material combinations and/or surface functionalizations (e.g., including terminations such as hydrogen, hydroxyl, hydrocarbon, nitrogen, thiol, silane, etc.) can additionally or alternatively be employed to alter (e.g., enhance, reduce) surface adhesion (e.g., to an electrode inner surface), thermal and/or electrical contact, diffusion (e.g., interdiffusion), chemical reactions, and/or any other suitable interfacial properties and/or processes. For example, the spacer 120 can include a first layer arranged in contact with a first electrode (e.g., cathode, anode) inner surface and a second layer arranged in contact with a second electrode (e.g., opposing the first electrode) inner surface. In a first example, the first layer exhibits strong adhesion to the first electrode inner surface (e.g., the first layer—first electrode interface has low interfacial energy), and the second layer exhibits weak adhesion to the second electrode inner surface (e.g., the second layer—second electrode interface has high interfacial energy). In a second example, both the first and second layers exhibit weak adhesion to the respective inner surface that they contact (e.g., have high interfacial energy, substantially equal interfacial energy). In a third example, both the first and second layers exhibit strong adhesion to the respective inner surface that they contact (e.g., have low interfacial energy, substantially equal interfacial energy). In a specific example, a spacer surface contacting the cathode includes a H-terminated surface functionalization, and a spacer surface contacting the anode includes a OH-terminated surface functionalization. However, the spacers 120 can include any other suitable combination of materials.

The spacers 120 can optionally include one or more frames and/or handling features. For example, a spacer, preferably defining a size substantially corresponding to an electrode (e.g., having substantially identical shapes and/or sizes), can include a frame (e.g., that extends outside the area of the electrode when the spacer 120 is aligned and in contact with the electrode), which can enable facile handling of the spacer 120 (e.g., during assembly of the small-gap device). The frame is preferably a robust feature (e.g., more mechanically robust than the interior portion of the spacer), such as including a continuous and/or thick structure (e.g., rather than a thin structure interrupted by apertures). In some examples, the frame is configured to break away from the spacer 120 (e.g., after device assembly), for example, from mechanical separation and/or thermal expansion stresses (e.g., the frame is connected to the interior portion of the spacer at intentionally-weakened interfaces, such as interfaces including perforations).

In some embodiments, the spacer(s) (and/or other elements of the system) can include one or more structures such as those described in U.S. patent application Ser. No. 15/456,718, which is hereby incorporated in its entirety by this reference, and/or include elements of such structures (e.g., modified such as described herein, such as defining non-linear paths and/or non-linear spacer surfaces, including multiple materials such as multilayer stacks, etc.).

The spacer(s) can additionally or alternatively include any other suitable features in any suitable arrangement.

1.4 Arrangement.

The spacer 120 is preferably arranged between the electrodes (e.g., between the inner surfaces of the electrodes). A lateral plane of the spacer and the inner surfaces of each electrode are preferably substantially parallel, but can alternatively have any other suitable arrangement.

Figure 7:
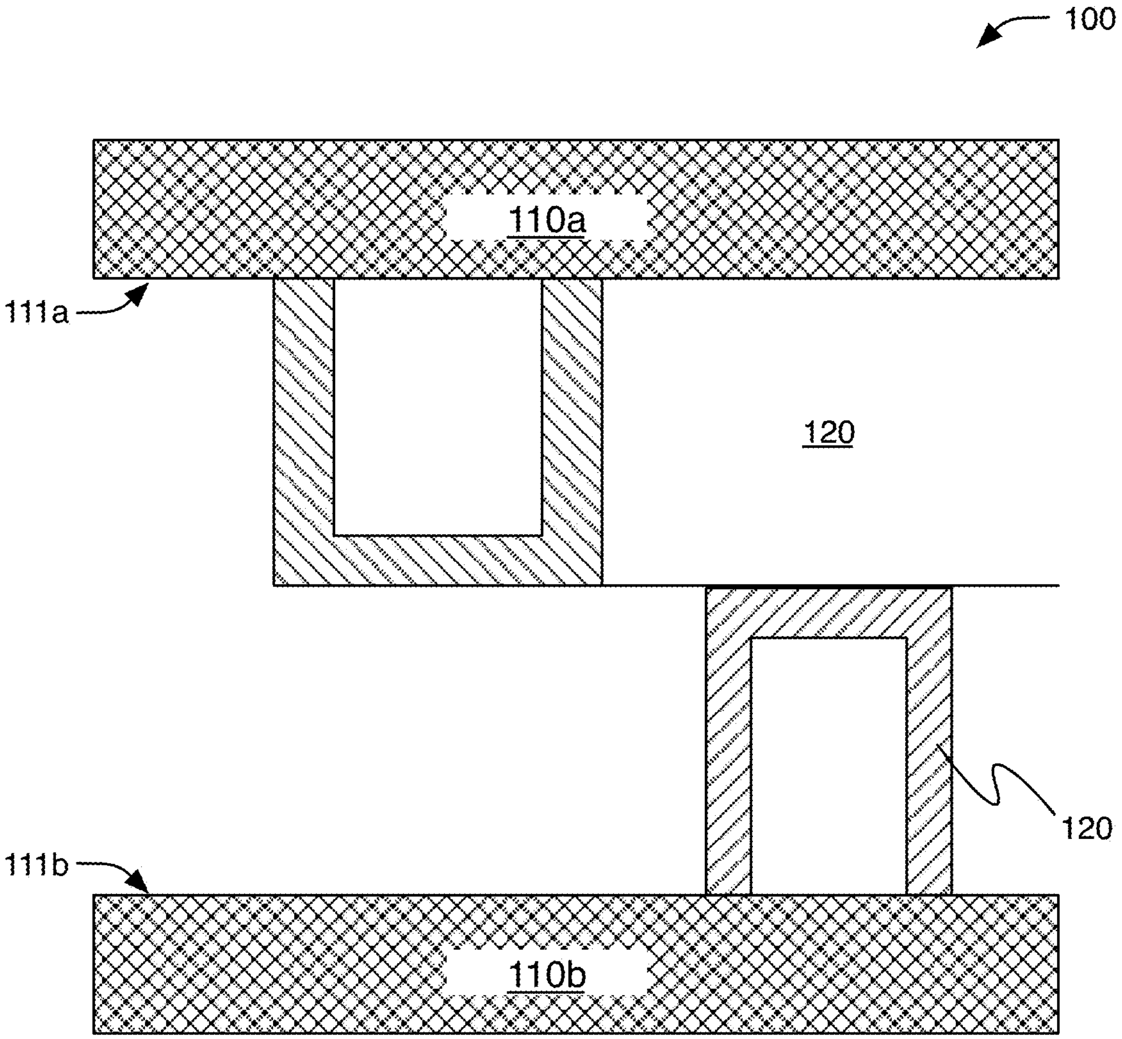
FIG. 7 is a cross-sectional side view of an example of the system, including multiple stacked spacers.

In some embodiments, the system includes multiple spacers 120 arranged (e.g., in a stack, laterally, etc.) between the electrodes, preferably wherein the lateral plane of each spacer is substantially parallel the inner electrode surfaces (e.g., as shown in FIG. 7). In these embodiments, the spacers 120 are preferably arranged with arbitrary lateral orientation and position with respect to each other, but can alternatively have any suitable arrangement with respect to each other. In these embodiments, the out-of-plane thermal and/or electrical conductance of the spacers 120 can be even lower than those of a single spacer (e.g., due to the limited areas in which the spacers 120 contact each other). In these embodiments, the multiple spacers 120 are preferably the same spacer type (e.g., geometry, material, etc.), but can alternatively be different spacer types.

However, the system can additionally or alternatively include any other suitable elements in any suitable arrangement.

2. Method of Fabrication.

Figure 8A:
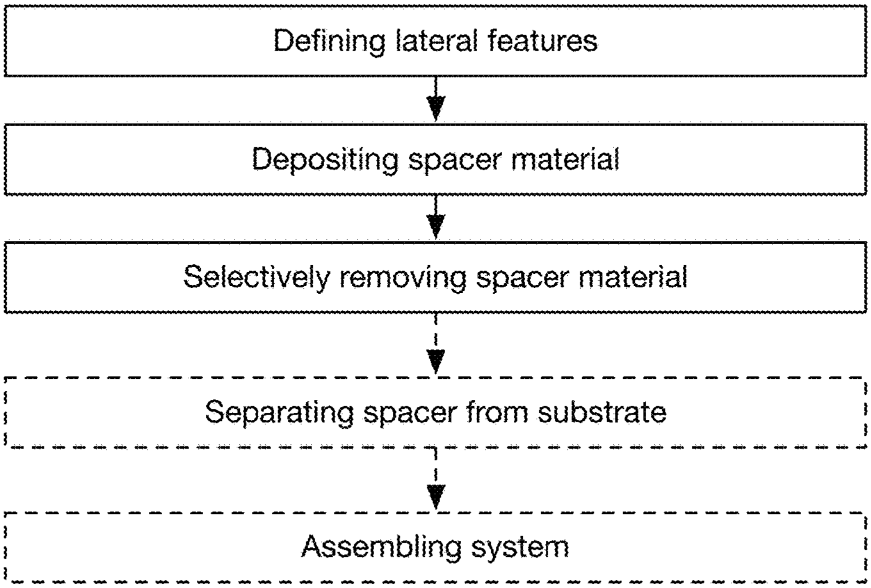
FIG. 8A is a flowchart representation of an embodiment of the method of fabrication.
Figure 8B:
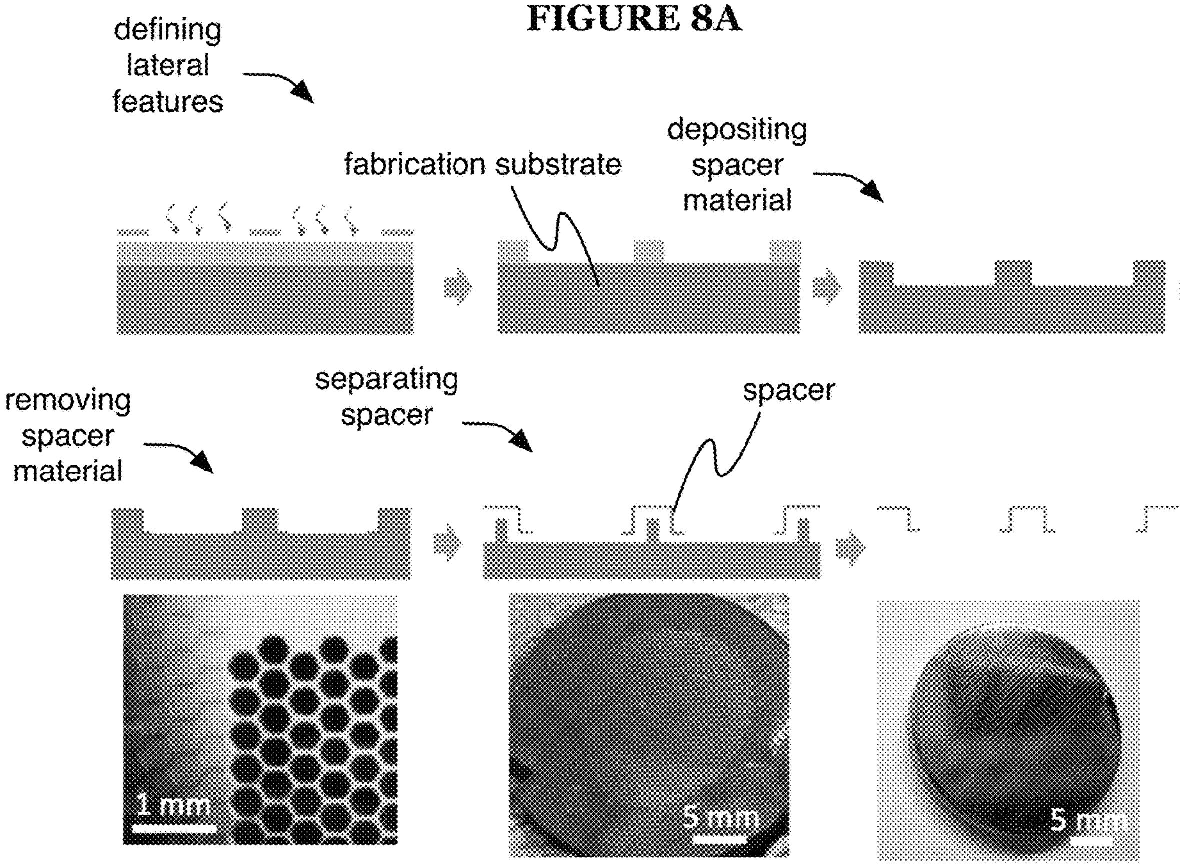
FIG. 8B is a schematic representation of an example of the method.
Figure 9:
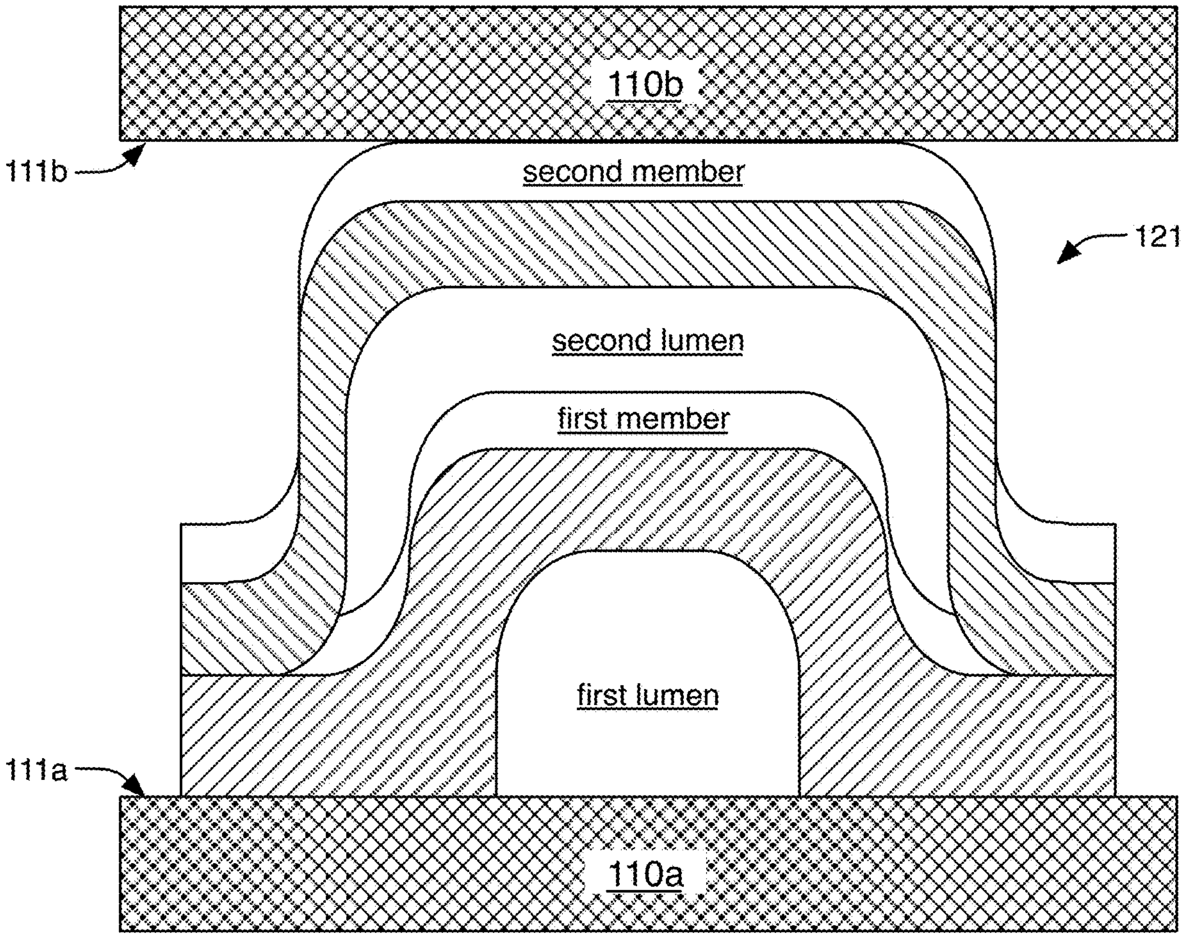
FIG. 9 is a cross-sectional side view of an example of the system.

A method of fabrication preferably includes defining lateral features, depositing spacer material, selectively removing spacer material, and separating the spacer from the fabrication substrate (e.g., as shown in FIGS. 8A-8B). The method can optionally include assembling the system.

Defining lateral features preferably includes creating a pattern on a fabrication substrate (e.g., substrate having a smooth surface, such as a polished silicon wafer). The lateral features (e.g., paths, vertices, channel widths, etc.) are preferably defined by lithography (e.g., photolithography), which can enable definition of arbitrary lateral features. However, the lateral features can additionally or alternatively be defined using self-assembly techniques (e.g., followed by a joining process, such as sintering, to create a free-standing spacer) and/or any other suitable techniques.

Spacer material is preferably deposited onto the patterned fabrication substrate. The spacer material is preferably deposited using a conformal deposition technique (e.g., atomic layer deposition, chemical vapor deposition, plating, etc.), but can additionally or alternatively be deposited using a less conformal technique (e.g., physical vapor deposition) and/or in any other suitable manner. The deposition is preferably controlled to deposit the desired spacer wall thickness. For alloyed and/or multilayer spacers 120, the spacer materials can be deposited sequentially, deposited in an alternating manner (e.g., creating multiple distinct layers, multiple layers that can subsequently diffuse into an alloy, a single alloyed layer, etc.), co-deposited, and/or deposited in any other suitable manner.

In one example, to fabricate a spacer that includes a layer of hafnia between layers of alumina, depositing spacer material can include: depositing a first layer of alumina onto the patterned fabrication substrate, depositing a layer of hafnia onto the first layer of alumina, and depositing a second layer of alumina onto the layer of hafnia. Similarly, to fabricate a spacer that includes a layer of alumina between layers of hafnia, depositing spacer material can include: depositing a first layer of hafnia onto the patterned fabrication substrate, depositing a layer of alumina onto the first layer of hafnia, and depositing a second layer of hafnia onto the layer of alumina.

In a second example, to fabricate a spacer that includes an interior (e.g., second) lumen, depositing spacer material can include: depositing a first layer (or set of layers, such as a multilayer stack as described above) of spacer material(s) onto the patterned fabrication substrate, depositing a sacrificial layer (e.g., of a material that can be etched away, preferably the same material and/or a material etchable by the same process as the fabrication substrate, such as Si) onto the first layer, and depositing a second layer (or set of layers, such as a multilayer stack as described above) of spacer material(s) onto the sacrificial layer. In a specific example of the second example, to fabricate a spacer that includes one or more support members (e.g., posts, columns, tubes, etc.) within the interior lumen, depositing spacer material can further include, before depositing the second layer of spacer material, patterning and etching the sacrificial layer to define the support members, wherein the support members are preferably deposited concurrently with the second layer, but can alternatively be deposited before the second layer and/or at any other suitable time.

In these examples, the layers are preferably deposited sequentially using atomic layer deposition, but some or all of the layers can additionally or alternatively be deposited using chemical vapor deposition and/or in any other suitable manner. However, depositing spacer material can be performed in any other suitable manner.

Selectively removing spacer material preferably includes removing undesired material (e.g., after spacer material deposition onto the fabrication substrate; preferably before but additionally or alternatively after spacer separation from the fabrication substrate). Undesired material can include spacer material between the intended paths (e.g., outside the patterned features; more than a threshold distance, such as the desired flange width, from the patterned features; etc.). The spacer material is preferably removed using a patterned etching process, such as laser micromachining, but can additionally or alternatively be removed in any other suitable manner.

Separating the spacer from the fabrication substrate preferably includes performing a release process (e.g., by a dry etch method, such as $XeF_2$ etching; by a wet etch method; etc.). However, the spacer can additionally or alternatively be separated from the fabrication substrate mechanically and/or in any other suitable manner.

Assembling the system can include placing the spacer on the inner surface of a first electrode, then placing the inner surface of a second electrode on the spacer, opposing the first electrode across the spacer. In embodiments in which multiple spacers 120 are used, spacers can be placed on multiple electrodes, multiple spacers can be stacked on a single electrode, and/or the multiple spacers can be placed between the electrodes in any other suitable manner. Assembling the system can optionally include adhering the spacer to the inner surface; aligning the spacer (e.g., with features of the electrode such as wafer edges, with other spacers, etc.), such as by magnetic alignment, mechanical alignment, fluid alignment, and/or optical alignment techniques; treating (e.g., curing, heating, exposing to chemical environments, etc.) the assembled structure; removing any handling features of the spacer, such as a handling frame; and/or assembling the system in any other suitable manner.

In some embodiments, the method (and/or elements of the method) can include method elements such as those described in U.S. patent application Ser. No. 15/456,718, which is hereby incorporated in its entirety by this reference.

However, the elements of the method can additionally or alternatively be performed in any other suitable manner, and/or the method can additionally or alternatively include any other suitable elements. For example, in alternative embodiments, the method can include fabricating the spacer(s) by subtractive techniques (e.g., etching the fabrication wafer to define the spacer), fabricating the spacer(s) in place (e.g., deposited directly onto an electrode inner surface, self-assembled on the electrode inner surface, defined by etching into an electrode inner surface, etc.), and/or fabricating the spacer(s) in any other suitable manner.

We claim:

1. A thermionic energy converter system, comprising:
a first electrode comprising a first surface;
a second electrode comprising a second surface; and
a mesh spacer maintaining a gap between the first and second surfaces;
wherein:
the first and second surfaces are arranged facing each other across the gap;
the mesh spacer electrically and thermally isolates the first electrode from the second electrode;
the mesh spacer defines a mesh structure comprising a set of vertices and a set of paths connected between vertices of the set, the set of paths comprising a first path and a second path, wherein the first path is substantially non-linear;
the mesh spacer comprises a set of legs extending substantially along the set of paths, the set of legs comprising:
a first canaliculate leg defining a first lumen along the first path, wherein the first canaliculate leg contacts the first surface; and
a second canaliculate leg defining a second lumen along the second path, the second canaliculate leg connected to the first canaliculate leg via the set of legs, wherein the second canaliculate leg contacts the second surface; and
the mesh spacer defines a plurality of apertures between legs of the set of legs, wherein, for each aperture of the plurality, a respective first surface normal vector from the first surface to the second surface passes through the aperture and does not intersect the mesh spacer.

2. The system of claim 1, wherein:
a projection of the mesh spacer onto the first surface, along a vector normal to the first surface, defines a spacer projected area;
a projection of a convex hull of the mesh spacer onto the first surface, along the vector, defines a convex hull projected area; and
a ratio of the spacer projected area to the convex hull projected area defines a fill fraction, wherein the fill fraction is less than 10%.

3. The system of claim 1, wherein the gap defines a gap width less than 25 μm between the first and second surface.

4. The system of claim 1, wherein:
the first canaliculate leg defines a first wall thickness less than 300 nm; and
the second canaliculate leg defines a second wall thickness less than 300 nm.

5. The system of claim 1, wherein the mesh spacer comprises a multilayer oxide structure in contact with the first and second surfaces.

6. The system of claim 5, wherein the multilayer oxide structure comprises:
a first oxide layer in contact with the first surface, the first oxide layer comprising hafnium;
a second oxide layer in contact with the second surface, the second oxide layer comprising hafnium; and
an intermediary oxide layer substantially encapsulated between the first and second oxide layers, the intermediary oxide layer comprising aluminum.

7. The system of claim 1, wherein the first canaliculate leg comprises:
a first member in contact with the first surface;
a second member arranged proximal the second surface; and
a sidewall connecting the first member to the second member, wherein a cross-section of the sidewall, defined on a plane normal the first path, is substantially non-linear between the first and second member;
wherein the sidewall and the second member cooperatively define the first lumen, wherein the second member is arranged between the first lumen and the second surface.

8. The system of claim 1, wherein:
the first path is connected between a first vertex and a second vertex of the set of vertices, wherein the system defines a segment from the first vertex to the second vertex;
the system defines a plane, wherein the plane includes the segment and a vector normal to the first surface; and
a projection of the first path onto the plane is substantially non-linear.

9. The system of claim 8, wherein a path length of the first path between the first and second vertex is greater than a segment length of the segment by more than 10%.

10. The system of claim 1, wherein the first path defines a plurality of arcs.

11. A thermionic energy converter system, comprising:
a first electrode comprising a first surface;
a second electrode comprising a second surface; and
a mesh spacer maintaining a gap between the first and second surfaces, the mesh spacer cooperatively retained within the gap by the first and second surfaces;
wherein:
the first and second surfaces are arranged facing each other across the gap;
the mesh spacer electrically and thermally isolates the first electrode from the second electrode;
the mesh spacer defines a mesh structure comprising a set of vertices and a set of paths connected between vertices of the set;
the mesh spacer comprises a leg extending substantially along a path of the set of paths, the leg comprising:
a first member defining a first lumen along the path; and
a second member connected to the first member along a length of the first member;
the first member contacts the first surface;
the second member is arranged between the first member and the second surface;
the first and second member cooperatively define a second lumen, wherein the first lumen is substantially separated from the second lumen by the first member;
the first member is arranged between the first surface and the second lumen; and
the second member is arranged between the second surface and the second lumen.

12. The system of claim 11, wherein the leg further comprises a plurality of support members arranged within the second lumen, each support member of the plurality connecting the first member to the second member.

13. The system of claim 11, wherein the second lumen is defined along a second path, wherein the second path is substantially identical to a translation of the path.

14. The system of claim 11, wherein the path is substantially non-linear.

15. The system of claim 11, wherein the first member comprises:

a first portion in contact with the first surface;

a second portion arranged between the first lumen and the second member; and a sidewall connecting the first portion to the second portion;

wherein the first lumen is defined between the sidewall and the second portion.

16. The system of claim 15, wherein the second member comprises:

a third portion in contact with the first member;

a fourth portion arranged between the third portion and the second surface; and a second sidewall connecting the third portion to the fourth portion;

wherein the second lumen is defined between the first member, the second sidewall, and the fourth portion.

17. The system of claim 11, wherein:

a projection of the mesh spacer onto the first surface, along a vector normal to the first surface, defines a spacer projected area;

a projection of a convex hull of the mesh spacer onto the first surface, along the vector, defines a convex hull projected area; and a ratio of the spacer projected area to the convex hull projected area defines a fill fraction, wherein the fill fraction is less than 25%.

18. The system of claim 11, wherein the gap defines a gap width less than 10 μm between the first and second surface.

19. The system of claim 11, wherein the mesh spacer comprises an oxide material in contact with the first and second surfaces.

20. The system of claim 11, wherein a temperature difference between a first surface average temperature and a second surface average temperature is greater than 200° C.

* * * * *